(12) United States Patent
Suganuma

(10) Patent No.: US 7,369,836 B2
(45) Date of Patent: May 6, 2008

(54) ADJACENT INTERFERENCE REMOVAL DEVICE

(75) Inventor: Hisashi Suganuma, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 542 days.

(21) Appl. No.: 11/033,273

(22) Filed: Jan. 12, 2005

(65) Prior Publication Data

US 2005/0164665 A1 Jul. 28, 2005

(30) Foreign Application Priority Data

Jan. 28, 2004 (JP) ............................. 2004-019710

(51) Int. Cl.
*H04B 1/10* (2006.01)

(52) U.S. Cl. .................. 455/306; 455/303; 455/307; 455/266; 455/254

(58) Field of Classification Search ................ 455/266, 455/303, 254, 306, 307
See application file for complete search history.

(56) References Cited

U.S. PATENT DOCUMENTS

| 3,769,591 | A | * | 10/1973 | Brown et al. ................ 375/351 |
| 4,085,368 | A | * | 4/1978 | Yeh ............................. 375/332 |
| 4,283,795 | A | * | 8/1981 | Steinberger ................. 455/283 |
| 4,388,731 | A | * | 6/1983 | King ........................... 455/221 |
| 4,435,821 | A | * | 3/1984 | Ito et al. ..................... 375/137 |
| 4,646,097 | A | * | 2/1987 | King ........................... 342/95 |
| 4,792,993 | A | * | 12/1988 | Ma ............................. 455/266 |
| 5,222,255 | A | * | 6/1993 | Kuo et al. ................... 455/266 |
| 5,339,454 | A | * | 8/1994 | Kuo et al. ................... 455/247.1 |
| 5,339,455 | A | * | 8/1994 | Vogt et al. .................. 455/266 |
| 5,465,410 | A | * | 11/1995 | Hiben et al. ................ 455/266 |
| 5,493,717 | A | * | 2/1996 | Schwarz ...................... 455/306 |
| 5,564,093 | A | * | 10/1996 | Matsumoto ................. 455/266 |
| 5,584,056 | A | * | 12/1996 | Kim ............................ 455/572 |
| 5,584,063 | A | * | 12/1996 | Brinkhaus ................... 455/266 |
| 5,758,296 | A | * | 5/1998 | Nakamura ................ 455/575.7 |
| 7,181,184 | B1 | * | 2/2007 | Dimeo et al. ............... 455/296 |
| 2003/0157914 | A1 | * | 8/2003 | Li et al. ...................... 455/296 |

FOREIGN PATENT DOCUMENTS

JP    08-097738    4/1996

* cited by examiner

*Primary Examiner*—Edward F. Urban
*Assistant Examiner*—RuiMeng Hu
(74) *Attorney, Agent, or Firm*—Arent Fox, PLLC

(57) ABSTRACT

An adjacent interference removal device capable of providing an improved reception quality. An IF signal Sin having passed through an IF filter having a pass frequency band width of 200 kHz is supplied to a first narrow band filter having a pass frequency band width extending from a center frequency (carrier frequency) of the IF filter to +50 kHz, as well as to a second narrow band filter having a pass frequency band width extending from a center frequency (carrier frequency) of the IF filter to −50 kHz. When an interference signal is contained in a first signal S1 outputted from the first narrow band filter but not in a second signal S2 outputted from the second narrow band filter, and when an interference signal is contained in a detection signal Sd2 generated by detecting the second signal S2 in a detector and contained in the second signal S2 itself but not contained in the first signal S1, the detection signal Sd1 generated by detecting the first signal S1 in another detector is outputted by performing a switchover in a signal selecting unit.

8 Claims, 12 Drawing Sheets

FIRST DETECTION SIGNAL Sd1

SECOND DETECTION SIGNAL Sd2

THIRD DETECTION SIGNAL Sd3

DETECTION SIGNAL Sx

DETECTION SIGNAL Sx

SUB DETECTION SIGNAL Scp

SWITCHOVER CONTROL SIGNAL SEL

SWITCHOVER CONTROL SIGNAL CHG

ADJACENT INTERFERENCE REMOVAL DEVICE

BACKGROUND OF THE INVENTION

The present invention relates to an adjacent interference removal device for removing an influence of an interference signal caused by an adjacent interference, from a received signal received by an FM broadcasting receiver or the like.

The present application claims priority from Japanese Applications No. 2004-19710, the disclosures of which are incorporated herein by reference.

Generally, with regard to an FM broadcasting receiver or the like, if an interference signal from an adjacent broadcasting station has been generated adjacent to a received signal from a desired broadcasting station, a sort of reception quality deterioration will occur due to the adjacent interference.

Conventionally, when such an adjacent interference has occurred, an applicable method is to reduce, on the receiver side, the pass band width of an IF filter which passes an intermediate frequency signal (IF signal), thereby removing the influence of the interference signal (refer to Japanese Unexamined Patent Application Publication No. Hei 08-097738).

The receiver disclosed in Japanese Unexamined Patent Application Publication No. Hei 08-097738, as shown in FIG. 1 of the patent publication, comprises a first path having a first IF filter (9) and a third buffer circuit (16), a second path having a second IF filter (10) and a fourth buffer circuit (17), both paths being connected on the rear side of a mixer (2). The receiver further includes a first level detecting circuit (13), a second level detecting circuit (14), a comparison circuit (15), the third buffer circuit (16), and the fourth buffer circuit (17).

The first IF filter (9), as shown in FIG. 3 of the above-mentioned patent publication, has a pass band width of 150 KHz with a center frequency (carrier frequency) 10.7 MHz as its center, i.e., a pass band width of −75 KHz to +75 KHz with its center frequency being 0 KHz, thereby limiting the IF signal outputted from the mixer (2) within a band width of 150 KHz and then supplying the same to the third buffer circuit (16).

The second IF filter (10), as shown in FIG. 3 of the above-mentioned patent publication, has a pass bandwidth of 50 KHz with a center frequency as its center, i.e., a pass band width of −25 KHz to +25 KHz with its center frequency being 0 KHz, thereby limiting the IF signal outputted from the mixer (2) within a band width of 50 KHz and then supplying the same to the fourth buffer circuit (17).

The first level detecting circuit (13) detects the level of an IF signal (whose band has been limited within 150 KHz) outputted from the first IF filter (9). On the other hand, the second level detecting circuit (14) detects the level of an IF signal (whose band has been limited within 50 KHz) outputted from the second IF filter (10).

The comparison circuit (15) performs a comparison between the results detected by the first and second level detecting circuits (13) and (14). If the level of the IF signal outputted from the first IF filter (9) is higher than that of the IF signal outputted from the second IF filter (10), it can be determined that an interference signal is contained in the IF signal outputted from the first IF filter (9). Then, by switching the third buffer circuit (16) off, and the fourth buffer circuit (17) on, an IF signal outputted from the second IF filter (10) is transmitted to a detecting circuit (6) side through the aforementioned fourth buffer circuit (17). On the other hand, if the level of the IF signal outputted from the first IF filter (9) is equal to that of the IF signal outputted from the second IF filter (10), it can be determined that an interference signal is not existing. Then, by switching the third buffer circuit (16) on, and the fourth buffer circuit (17) off, the IF signal outputted from the second IF filter (10) is transmitted to the detecting circuit (6) side through the third buffer circuit (16).

In this way, the receiver disclosed in Japanese Unexamined Patent Application Publication No. Hei 08-097738, comprises the first IF filter (9) having a pass band width of 150 KHz, and the second IF filter (10) having a pass band width of 50 KHz. If an interference signal is contained in the IF signal outputted from the mixer (2), the receiver will operate to limit the band of the IF signal by virtue of the second IF filter (10) having a narrow pass band width.

However, although it is possible to remove the influence of an interference signal upon limiting the band of each IF signal within 50 KHz by virtue of the second IF filter (10), since a distortion occurs in a detection output signal outputted from the detecting circuit (6), it has been found difficult to improve an actual reception quality.

Moreover, for example in Europe (European nations), since channels of adjacent broadcasting stations are separated from each other only at 100 KHz, it is easy to receive an influence of an interference signal from an adjacent channel separated −50 KHz and +50 KHz from the center frequency of a desired signal. On the other hand, whenever receiving an influence of such an adjacent interference, the band of each IF signal will be reduced to within a narrow width of 50 KHz by virtue of the second IF filter (10), thereby making it possible to remove the influence of an interference signal. However, since a distortion occurs in a detection output signal outputted from the detecting circuit (6), it has been found difficult to improve an actual reception quality.

SUMMARY OF THE INVENTION

The present invention has been accomplished in order to solve the aforementioned conventional problem, and it is an object of the present invention to provide an adjacent inference removal device capable of improving an actual reception quality.

According to the present invention, there is provided an adjacent interference removal device for removing an influence of an adjacent interference caused by an interference signal contained in an IF signal having passed through an IF filter having a pass frequency band width with a carrier frequency as its center. The adjacent interference removal device comprises: a first narrow band filter which inputs into itself the IF signal and has a pass frequency band width extending from the carrier frequency of the IF filter to a predetermined frequency higher than an upper side closest adjacent channel carrier frequency; a second narrow band filter which inputs into itself the IF signal and has a pass frequency band width extending from the carrier frequency of the IF filter to a predetermined frequency lower than a lower side closest adjacent channel carrier frequency; first detecting means for detecting a first signal having passed through the first narrow band filter; second detecting means for detecting a second signal having passed through the second narrow band filter; signal selecting means for outputting at least a first detection signal outputted from the first detecting means or a second detection signal outputted from the second detecting means; identifying means for identifying whether an interference signal is contained in the first signal or contained in the second signal; and control means which allows the signal selecting means to output the first detection signal when the identifying means identifies that the interference signal is contained in the first signal but not in the second signal, and allows the signal selecting means to output the second detection signal when the identifying means identifies that the interference signal is contained in the second signal but not in the first signal.

The adjacent interference removal device of the present invention further comprises: main detecting means for supplying a main detection signal generated by detecting the IF signal to the signal selecting means; a narrow band pass filter which inputs into itself the IF signal and has a narrow pass frequency band width coincident with the carrier frequency of an adjacent channel; and adjacent station detecting means which detects whether an interference signal is contained in an output signal of the narrow band pass filter, and allows the signal selecting means to output the first or second detection signal when an interference signal is detected, but allows the signal selecting means to output the main detection signal when the interference signal is not detected.

The adjacent interference removal device of the present invention further comprises: a third narrow band filter which inputs into itself the IF signal, uses said carrier frequency as its center, and has a pass frequency band width narrower than that of each of the first and second narrow band filters; and third detecting means for detecting a third signal having passed through the third narrow band filter, and supplying a third detection signal to the signal selecting means. Once the identifying means identifies that an interference signal is contained in each of the first signal and the second signal, the control means allows the signal selecting means to output the third detection signal.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

A preferred embodiment of the present invention will be described based on an adjacent interference removal device to be provided in an FM broadcasting receiver, with reference to FIG. 1 and FIG. 2.

Figure 1:
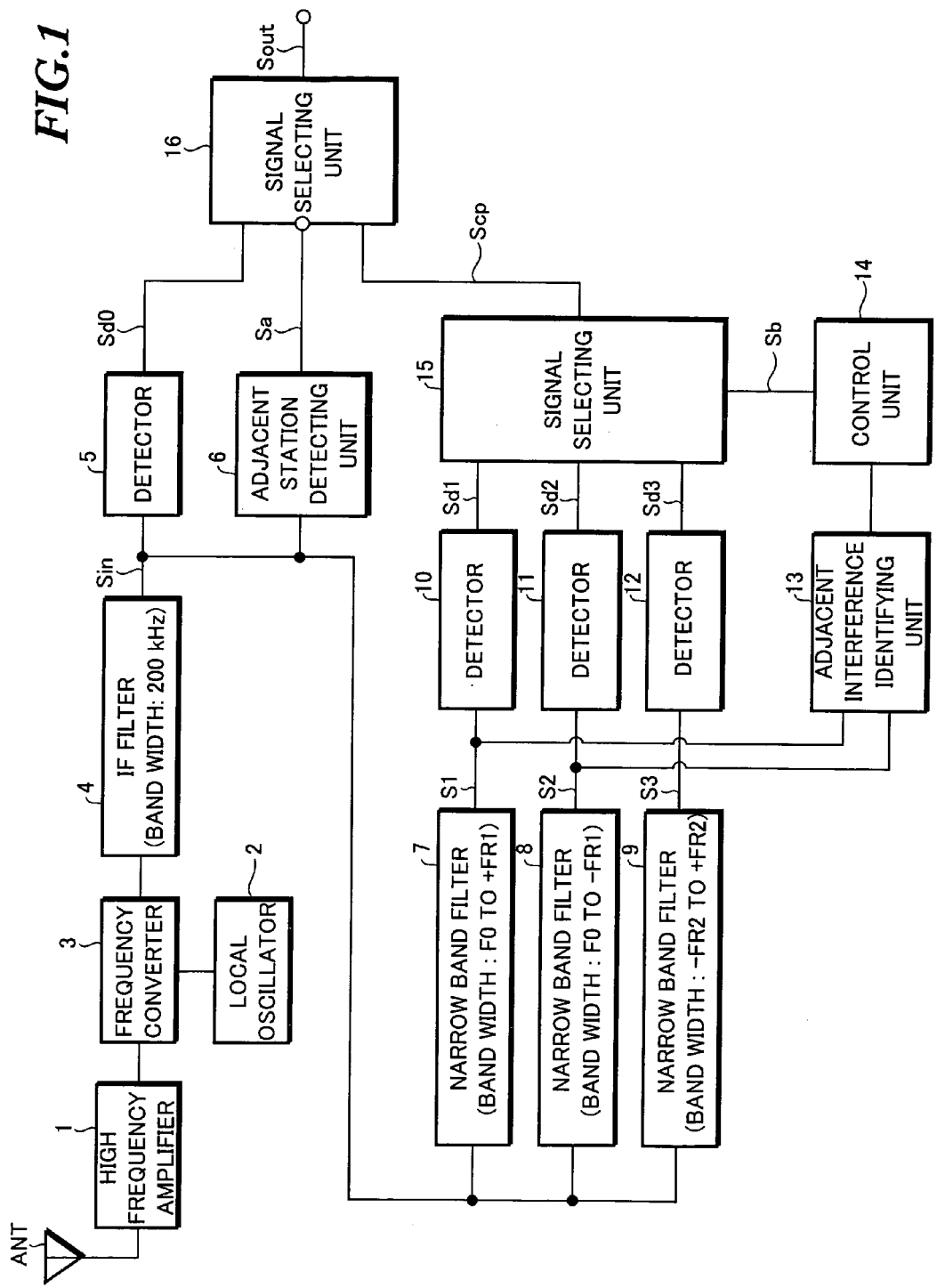
FIG. 1 is a block diagram showing the structure of an adjacent interference removal device formed according to an embodiment of the present invention.
Figure 2:
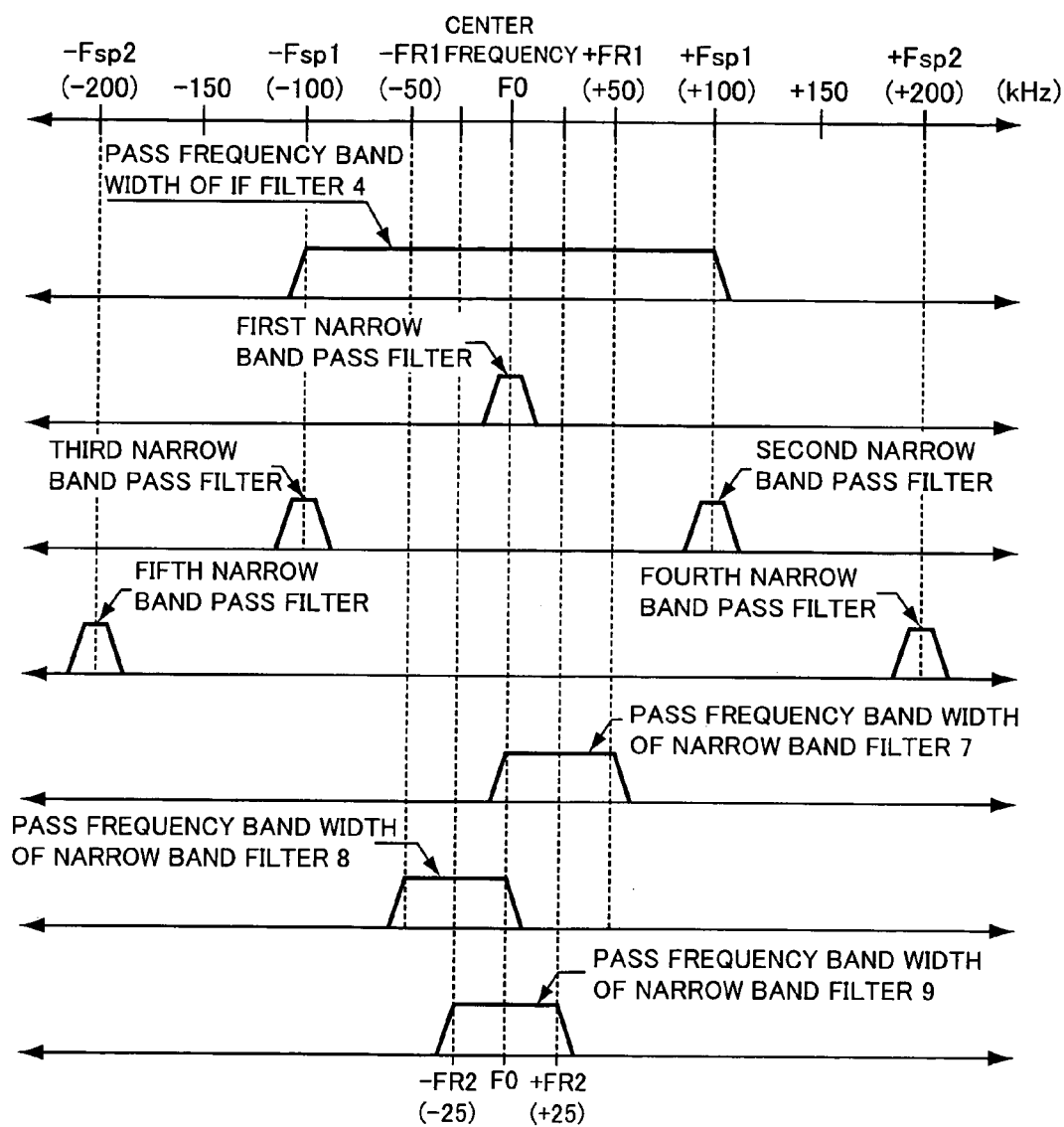
FIG. 2 is a chart showing the pass frequency band widths of filters provided within the adjacent interference removal device.

FIG. 1 is a block diagram showing the structure of the adjacent interference removal device, and FIG. 2 is a chart showing the pass frequency band width of filters provided in the adjacent interference removal device.

As shown in FIG. 1, the adjacent interference removal device of the present embodiment is subordinately connected with the output of an IF filter 4 provided in an FM-broadcasting receiver. Once an IF signal Sin outputted from the IF filter 4 contains an interference signal from an adjacent broadcasting station, the adjacent interference removal device will output a detection output signal (composite signal) Sout free from any influence of an interference signal.

Namely, an antenna ANT receives an arrival electric wave, and a frequency converter 3 mixes an RF signal outputted from a high frequency amplifier 1 with a local signal outputted from a local oscillator 2 to output an intermediate frequency signal (IF signal) When the IF filter 4 having a predetermined pass frequency band width carries out a band restriction on the IF signal and outputs a band-limited IF signal Sin, the adjacent interference removal device of the present embodiment will receive an IF signal Sin outputted from the IF filter 4 and output a detection output signal Sout free from any influence of an interference signal.

For example, suppose that the IF filter 4 is a usual IF filter which allows the passing of an IF signal having a maximum frequency deviation of ±100 kHz, with the center frequency (carrier frequency) F0 of a desired signal being the center thereof, as schematically shown in FIG. 2. At this time, the adjacent interference removal device of the present embodiment inputs into itself an IF signal Sin outputted from the IF filter 4 having a pass frequency band width of 200 kHz.

Further, the adjacent interference removal device of the present embodiment also inputs into itself an IF signal Sin not limited in its frequency band.

As shown, the adjacent interference removal device of the present embodiment comprises a detector 5, an adjacent station detecting unit 6, narrow band filters 7, 8, and 9, detectors 10, 11, and 12, an adjacent interference identifying unit 13, a control unit 14, and signal selecting units 15, 16.

The detector 5 FM-detects an IF signal Sin, and outputs a detection signal (composite signal) Sd0 to the signal selecting unit 16.

The adjacent station detecting unit 6 comprises a plurality of narrow band pass filters each receiving an IF signal Sin and detecting an interference signal, and outputs a switchover control signal Sa responsive to a detection result to the signal selecting unit 16.

Namely, as schematically shown in FIG. 2, the adjacent station detecting unit 6 includes a first narrow band pass filter having a narrow pass frequency band width at the center frequency F0 of a desired signal, and second through fifth narrow band pass filters having respectively narrow pass frequency band widths coincident with frequencies +Fsp1, −Fsp1, +Fsp2, and −Fsp2 (which are frequencies deviated +100 kHz, −100 kHz, +200 kHz, and −200 kHz from the center frequency F0) of adjacent channels.

When the levels (amplitudes) of all output signals passing through the second through fifth narrow band pass filters are lower than the level of an output signal passing through the first narrow band pass filter, the adjacent station detecting unit 6 judges that no interference signal is involved, and controls the signal selecting unit 16 by a switchover control signal Sa, so as to output a detection signal Sd0 as a detection output signal Sout.

On the other hand, when the level of at least one of the signals passing through the second through fifth narrow band pass filters is lower than the level of an output signal passing through the first narrow band pass filter, the adjacent station detecting unit 6 judges that no interference signal is involved, and controls the signal selecting unit 16 by a switchover control signal Sa, so as to output a detection signal Scp as a detection output signal Sout.

The narrow band filter 7 is formed by a band pass filter having a pass frequency band width extending from the center frequency F0 to an +Fsp1/2 deviated frequency +FR1.

Further, the narrow band filter 8 is formed by a band pass filter having a pass frequency band width extending from the center frequency F0 to an −Fsp1/2 deviated frequency −FR1.

Moreover, the narrow band filter 9 is formed by a band pass filter having a pass frequency band width extending from a frequency −FR2 (equivalent to −FR1/2) to a frequency +FR2 (equivalent to +FR1/2) with the center frequency F0 as the center thereof.

In more detail, as shown in FIG. 2, if the center frequency F0 is deemed as 0 kHz, the narrow band filter 7 will have a pass frequency band width extending from the center frequency F0 to +50 kHz, the narrow band filter 8 will have a pass frequency band width extending from the center frequency F0 to −50 kHz, and the narrow band filter 9 will have a pass frequency band width extending from −25 KHz to +25 kHz, with the center frequency F0 serving as the center thereof, thus outputting IF signals S1, S2, and S3 which have been band-limited by the respective pass frequency band widths.

The detector 10 FM-detects an IF signal S1 band-limited by the narrow band filter 7 to output a detection signal Sd1, the detector 11 FM-detects an IF signal S2 band-limited by the narrow band filter 8 to output a detection signal Sd2, and the detector 12 FM-detects an IF signal S3 band-limited by the narrow band filter 9 to output a detection signal Sd3.

The signal selecting unit 15 inputs into itself the detection signals Sd1, Sd2, and Sd3, selects any one of the detection signals Sd1, Sd2, and Sd3 as the above-mentioned detection signal Scp to the signal selecting unit 16, in accordance with a switchover control signal Sb fed from the control unit 14.

The adjacent interference identifying unit 13 performs a comparison between the levels (amplitudes) of IF signals S1 and S2. When the level of IF signal S1 is higher than the level of IF signal S2, the adjacent interference identifying unit 13 judges that IF signal S1 contains an interference signal. On the other hand, when the level of IF signal S1 is lower than the level of IF signal S2, the adjacent interference identifying unit 13 judges that IF signal S2 contains an interference signal. Further, when the levels of IF signals S1 and S2 both become higher than a predetermined reference level, it is judged that the IF signals S1 and S2 each contains an interference signal.

Namely, the adjacent interference identifying unit 13 performs a comparison between the levels (amplitudes) of IF signals S1 and S2 so as to judge that an IF signal S1 contains an interference signal and to detect a period during which the interference signal occurs. In addition, the adjacent interference identifying unit 13 also judges that an IF signal S2 contains an interference signal and to detect a period during which the interference signal occurs. Further, the adjacent interference identifying unit 13 judges that each of the IF signal S1 and the IF signal S2 contains an interference signal and to detect the periods during which the interference signals occur. In this way, the information indicating the results of these judgments and detections is supplied at a real time into the control unit 14.

The control unit 14 operates in accordance with the information indicating the results of the above judgments and detections and fed from the adjacent interference identifying unit 13, so as to generate and output a switchover control signal Sb for controlling the switchover of the signal selecting unit 15.

That is, the control unit 14 performs the following processing in accordance with the information indicating the results of the above judgments and detections.

At first, once it is judged that IF signal S1 does not contain an interference signal and that IF signal S2 contains such an interference signal, the signal selecting unit 15 is controlled in accordance with the switchover control signal Sb, so as to transmit a detection signal Sd1 as a detection signal Scp to the signal selecting unit 16.

On the other hand, once it is judged that not each of the IF signals S1 and S2 contains an interference signal and that only IF signal S1 contains such an interference signal, the signal selecting unit 15 is controlled in accordance with the switchover control signal Sb, so as to transmit a detection signal Sd2 as a detection signal Scp to the signal selecting unit 16.

Further, if it is judged that each of the IF signals S1 and S2 contains an interference signal, the signal selecting unit 15 is controlled in accordance with the switchover control signal Sb, so as to transmit a detection signal Sd3 as a detection signal Scp to the signal selecting unit 16.

Next, description will be given to explain an operation of the adjacent interference removal device of the present embodiment having the above-described structure.

For the purpose of an easy explanation, in the following description, an IF signal Sin outputted from the IF filter 4 is referred to as a main IF signal, the IF signals S1, S2, and S3 outputted from the narrow band filters 7, 8, and 9 are referred to as a first IF signal, a second IF signal, and a third IF signal, respectively. Furthermore, a detection signal Sd0 outputted from the detector 5 is referred to as a main detection signal, while a detection signal Scp outputted from the signal selecting unit 15 is referred to as a sub detection signal, the detection signals Sd1, Sd2, and Sd3 outputted from the detectors 10, 11, and 12 are referred to as a first detection signal, a second detection signal, and a third detection signal, respectively.

The adjacent station detecting unit 6 operates to detect whether there is an interference signal at a frequency +Fsp1 (+100 kHz), a frequency −Fsp1 (−100 kHz), an adjacent channel frequency +Fsp2 (+200 kHz), and a frequency −Fsp2 (−200 kHz), with the center frequency F0 of a desired signal serving as the center thereof. If it is judged that the main IF signal Sin does not contain an interference signal, the signal selecting unit 16 is controlled to output, as a detection output signal Sout, a main detection signal Sd0 from the detector 5, and to forbid the outputting of the sub detection signal Scp from the signal selecting unit 15. Therefore, when there is no interference signal, all the signal components within the maximum frequency deviation of the main IF signal Sin will be detected, thereby outputting the detection output signal Sout.

On the other hand, once the adjacent station detecting unit 6 detects at least one interference signal at frequency +Fsp1 (+100 kHz), a frequency −Fsp1 (−100 kHz), an adjacent channel frequency +Fsp2 (+200 kHz), or a frequency −Fsp2 (−200 kHz), it is judged that the main IF signal Sin contains an interference signal from an adjacent station. Then, the signals-electing unit 16 is controlled to forbid the outputting of the main detection signal Sd0, and to output a sub detection signal Scp from the signal selecting unit 15 as a detection output signal Sout.

Then, assuming that the sub detection signal Scp is outputted as a detection output signal Sout, the elements 7 to 15 shown in FIG. 1 operate to generate the sub detection signal Scp.

Namely, the narrow band filters 7, 8, and 9 operate to limit the frequency band of the main IF signal Sin by the respective predetermined pass frequency band widths, so as to output a first IF signal S1, a second IF signal S2, and a third IF signal S3. Further, the detectors 10, 11, and 12 operate to FM-detect the first IF signal S1, the second IF signal S2, and the third IF signal S3, respectively, thereby outputting a first detection signal Sd1, a second detection signal Sd2, and a third detection signal Sd3.

The adjacent interference identifying unit 13 operates to perform a comparison between the level of the first IF signal S1 and the level of the second IF signal S2, and identify either the first IF signal S1 or the second IF signal S2 containing an interference signal and detect a period during which the interference signal occurs. If each of the first IF signal S1 and the second IF signal S2 contains an interference signal, the adjacent interference identifying unit 13 will provide an identification result indicating that each of the first and second IF signals contains an interference signal and detect a period during which the interference signal occurs.

Furthermore, the control unit 14 operates to perform any one of the following switchover controls on the signal selecting unit 15, in accordance with the identification information and the occurrence period information fed from the adjacent interference identifying unit 13, thereby transmitting, as a sub detection signal Scp, any one of the first, second, and third detection signals Sd1, Sd2, and Sd3 towards the signal selecting unit 16.

That is, upon judging that not each of the first and second IF signals S1 and S2 contains an interference signal and that only the second IF signal S2 contains an interference signal, the control unit 14 operates to transmit a first detection signal Sd1 as a detection signal Scp to the signal selecting unit 16, during the interference signal occurring period. Namely, if the second IF signal S2 contains an interference signal coming from an adjacent station and having, as a carrier frequency of an adjacent channel, a lower side frequency −Fsp1 or −Fsp2 with respect to the center frequency F0 shown in FIG. 2, and if the first IF signal S1 does not contain any interference signal, the control unit 14 will transmit a first detection signal Sd1 not affected by an interference signal, as a sub detection signal Scp, to the signal selecting unit 16, with such transmission being performed in a period during which the interference signal occurs. Subsequently, the sub detection signal Scp (i.e., the first detection signal Sd1) is outputted as a detection output signal Sout through the signal selecting unit 16.

On the other hand, upon judging that not each of the first and second IF signals S1 and S2 contains an interference signal and that only the first IF signal S1 contains an interference signal, the control unit 14 operates to transmit a second detection signal Sd2 as a detection signal Scp to the signal selecting unit 16 during the interference signal occurring period. Namely, if the first IF signal S1 contains an interference signal coming from an adjacent station and having, as a carrier frequency of an adjacent channel, a higher side frequency +Fsp1 or +Fsp2 with respect to the center frequency F0 shown in FIG. 2, and if the second IF signal S2 does not contain any interference signal, the control unit 14 will transmit a second detection signal Sd2 not affected by an interference signal, as a sub detection signal Scp, to the signal selecting unit 16, with such transmission being performed in a period during which the interference signal occurs. Subsequently, the sub detection signal Scp (i.e., the second detection signal Sd2) is outputted as a detection output signal Sout through the signal selecting unit 16.

Moreover, upon judging that each of the first and second IF signals S1 and S2 contains an interference signal, the control unit 14 will operate to transmit a third detection signal Sd3 as a sub detection signal Scp to the signal selecting unit 16 during an interference signal occurring period.

If each of the first and second IF signals S1 and S2 contains an interference signal coming from an adjacent station and having, as a carrier frequency of an adjacent channel, a lower side frequency −Fsp1 or −Fsp2 with respect to the center frequency F0 shown in FIG. 2, and/or another interference signal coming from an adjacent station and having, as a carrier frequency of an adjacent channel, a higher side frequency +Fsp1 or +Fsp2 with respect to the center frequency F0 shown in FIG. 2, the control unit 14 will transmit a third detection signal Sd3 not affected by an interference signal, as a sub detection signal Scp, to the signal selecting unit 16, with such transmission being performed in a period during which the interference signal occurs. Subsequently, the sub detection signal Scp (i.e., the third detection signal Sd2) is outputted as a detection output signal Sout through the signal selecting unit 16.

As described above, using the adjacent interference removal device of the present embodiment makes it possible to obtain the following advantages.

First, as shown in FIG. 2, once there is an interference signal coming from an adjacent station at a high band cutoff frequency +Fsp1 of the main IF filter 4, a low band cutoff frequency −Fsp1 of the main IF filter 4, a frequency Fsp2 which is two times the high band cutoff frequency +Fsp1, or a frequency which is two times the low band cutoff frequency −Fsp1, since a sub detection signal Scp rather than a main detection signal Sd0 is outputted as a detection output signal Sout, it is possible to output a detection output signal less affected by an adjacent interference.

The narrow band filter 7 has a pass frequency band width extending from the center frequency F0 to a frequency +FR1 which is ½ of the high band cutoff frequency +Fsp1. The narrow band filter 8 has a pass frequency band width extending from the center frequency F0 to a frequency −FR1 which is ½ of the low band cutoff frequency −Fsp1. When a sub detection signal Scp is outputted as a detection output signal Sout, a detection signal generated by detecting one of IF signals S1 and S2 (such signal contains no interference signal) outputted from the narrow band filter 7 and the narrow band filter 8 is selected as a sub detection signal Scp and is used as a detection output signal Sout, so that it is possible to output a detection output signal Sout not affected by an interference signal, without greatly removing an original detection signal component contained in the main IF signal Sin. For this reason, it is possible for the radio receiver to reproduce a high quality sound signal having a reduced distortion, in accordance with the detection output signal Sout, thereby ensuring an improved reception quality.

Moreover, as described above, in an area such as Europe (including various European countries), the channels of adjacent stations are separated 100 kHz from each other. In order to remove an influence of an interference signal coming from an adjacent station (the interference signal uses as its carrier frequency a frequency separated −50 kHz and +50 kHz from the center frequency F0), a narrow band filter is employed which uses as its pass frequency band width a band extending from −25 kHz to +25 kHz with the center frequency F0 serving as the center, thereby removing an influence of the interference signal by greatly limiting the frequency band of all IF signals. As a result, distortion will occur in sound signal, rendering it difficult to reproduce a high quality sound signal. To solve such problem existing in the prior art, the adjacent interference removal device formed according to the present embodiment of the present invention, employs not only a narrow band filter which uses a band of −25 kHz to +25 kHz as its pass frequency band width, to merely limit the band of the main IF signal Sin, but also the narrow band filters 7 and 8 providing a total pass frequency band width of 100 KHz. In this way, the narrow band filter 7 is assigned to form a pass frequency band width extending from the center frequency F0 to +50 kHz, while the narrow band filter 8 is assigned to form a pass frequency band width extending from the center frequency F0 to −50 kHz, thereby outputting as a detection output signal Sout a detection signal Sd1 or Sd2 generated by detecting the IF signal S1 or S2 (the one not affected by an interference signal). Therefore, it becomes possible to output a detection signal Sout without greatly removing an original detection signal component contained in the main IF signal Sin. For this reason, if a sound signal is-reproduced based on the detection output signal Sout, it is possible to reproduce a high quality sound signal with less distortion, thereby improving a reception quality.

Then, in case each of the IF signals S1 and S2 contains an interference signal, since the detection signal Sd3 generated by detecting an IF signal S3 outputted from the narrow band filter 9 (which has a pass frequency band width narrower than the total pass frequency band width of the narrow band filters 7 and 8) is selected as a sub detection signal Scp and deemed as a detection output signal Sout, it is possible to exactly output a detection output signal Sout free from any interference signal.

In addition, as a modification of the above-described embodiment, it is also possible to remove the detectors 5, 10, 11, and 12 shown in FIG. 1, and to connect one detector to the output of the signal selecting unit 16. Meanwhile, the main IF signal Sin rather than the main detection signal Sd0 can be supplied to the signal selecting unit 16. Further, the first through third IF signals S1, S2, and S3 rather than the first through third detection signals Sd1, Sd2, and Sd3 are supplied to the signal selecting unit 15.

However, in this modification, since a switchover operation is quickly performed between the signal selecting units 15 and 16, a distortion is easy to mix into an IF signal being outputted from the signal selecting unit 16 to the above-mentioned one detector. Accordingly, for the purpose of reproducing a high quality sound signal, it is preferable to use the adjacent interference removal device of the present embodiment described with reference to FIG. 1, thereby obtaining an improved reception quality.

Detailed Embodiment

Figure 3:
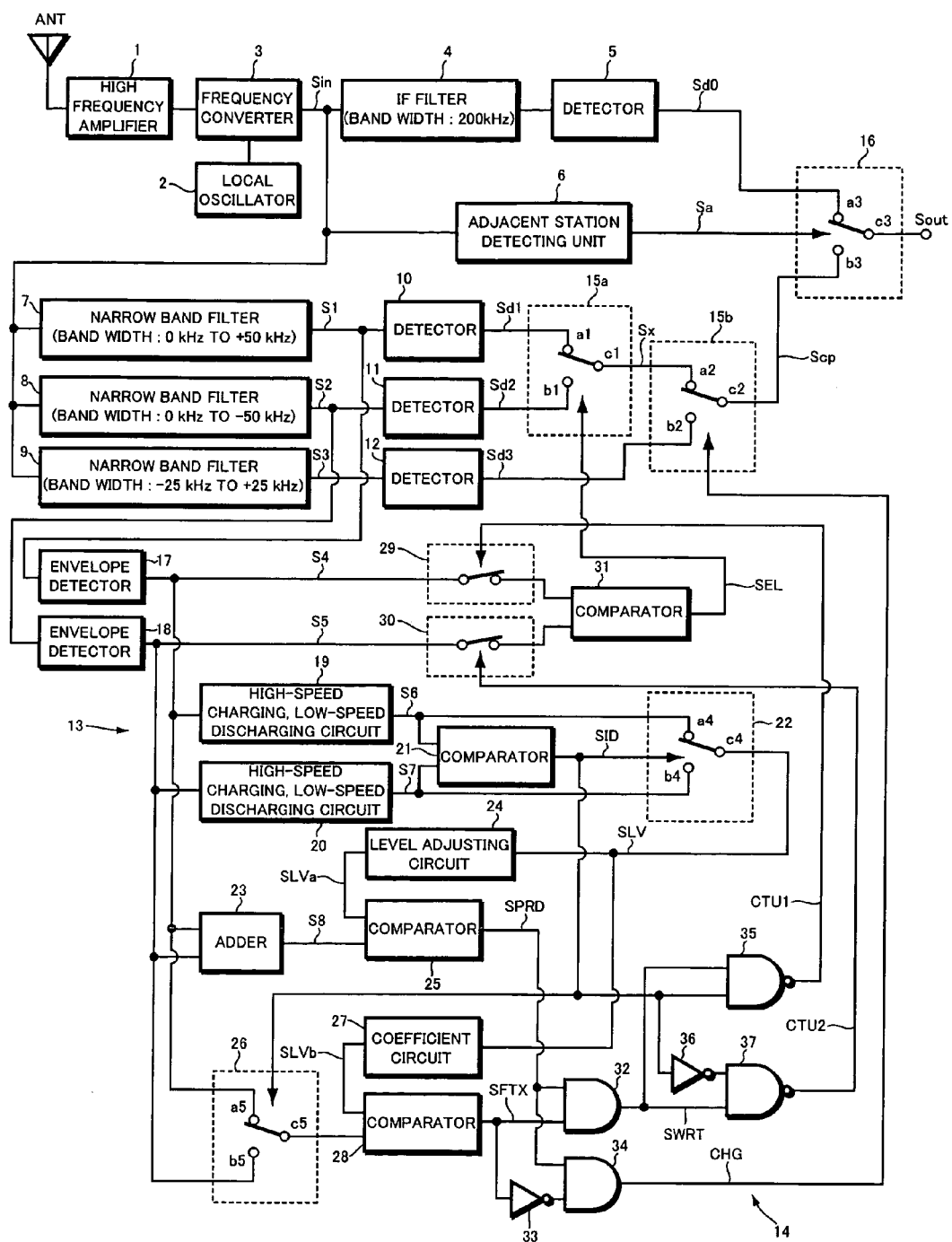
FIG. 3 is a block diagram showing in more detail the structure of an adjacent interference removal device formed according to the embodiment of the present invention.
Figure 4:
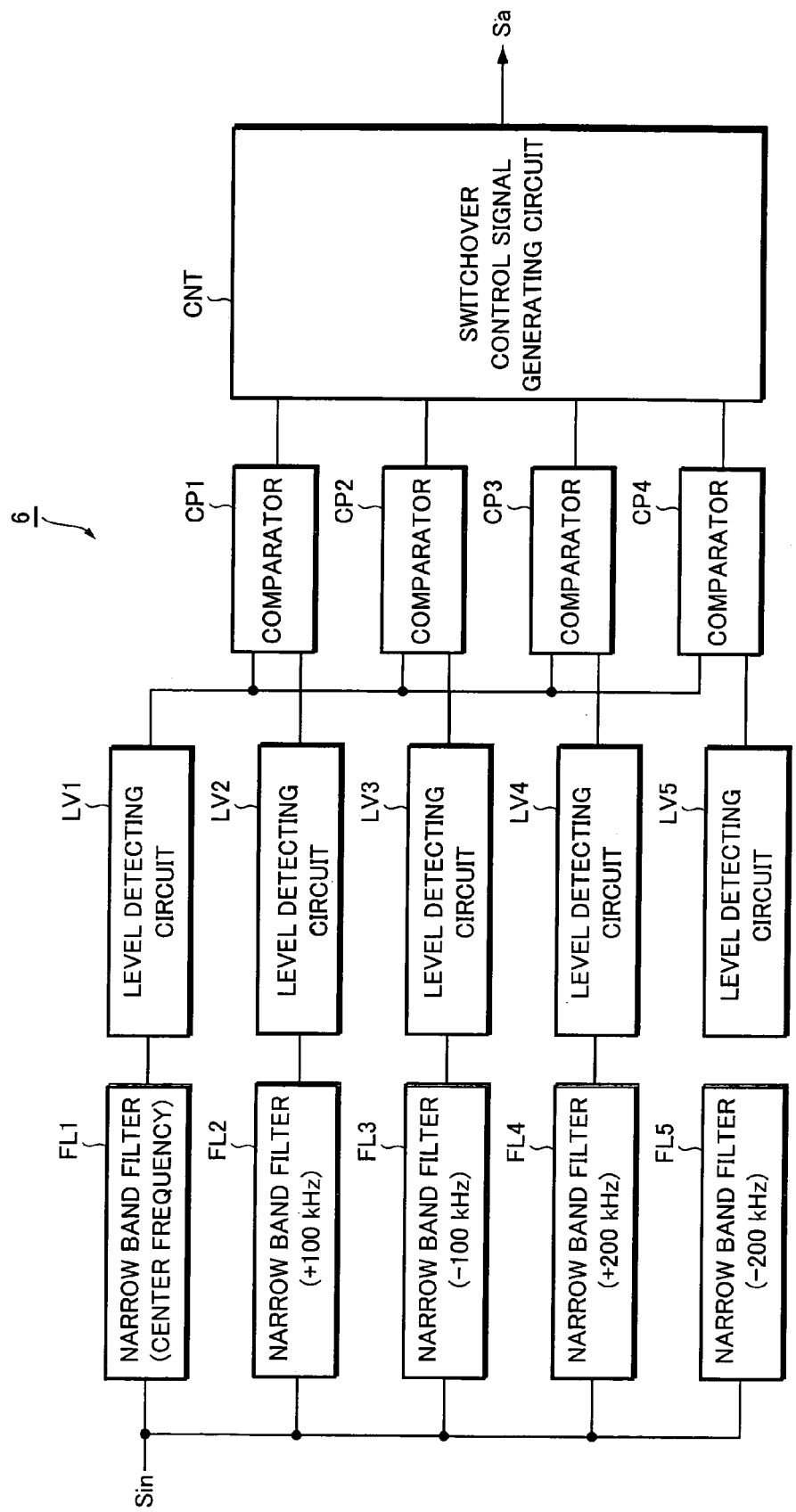
FIG. 4 is a block diagram showing the structure of an adjacent station detecting circuit shown in FIG. 3.

A detailed embodiment according to the present invention will be described below with reference to FIGS. 3 through 12. FIG. 3 and FIG. 4 are block diagrams showing the structure of an adjacent interference removal device formed according to the present embodiment. However, elements which are the same as or corresponding to those shown in FIG. 1 will be represented by the same reference numerals.

The structure of an adjacent interference removal device according to the present embodiment shown in FIG. 3 and FIG. 4 will be described in comparison with the embodiment shown in FIG. 1. In fact, the signal selecting unit 15 shown in FIG. 1 is formed by switching circuits 15a and 15b shown in FIG. 3, while the signal selecting unit 16 shown in FIG. 1 is formed by a switching circuit 16 shown in FIG. 3. Practically, these switching circuits 15a, 15b, and 16 are formed by for example two-input one-output type analog switches or the like.

Further, an adjacent station detecting circuit 6 shown in FIG. 3 is an equivalent to the adjacent station detecting unit 6 shown in FIG. 1. As shown in FIG. 4, such an adjacent station detecting circuit 6 comprises a plurality of narrow band pass filters FL1 to FL5, level detectors LV1 to LV5, comparators CP1 to CP4, and a switchover signal generating circuit CNT.

Here, the narrow band pass filter FL1 acts as a first narrow band pass filter having a narrow pass frequency band width at the center frequency F0 shown in FIG. 2, while the narrow band pass filters FL2 to FL5 act as second through fifth narrow band pass filters having narrow pass frequency band widths at +Fsp1, −Fsp1, +Fsp2, and −Fsp2 which are frequencies of adjacent channels and deviated 100 kHz, −100 kHz, 200 kHz, and −200 kHz from the center frequency F0.

Each of the narrow band pass filters FL1 to FL5 operates to input into itself a main IF signal Sin outputted from the main IF filter 4 having a pass frequency band width of 200 kHz, and to output an IF signal whose frequency band has been limited by a pass frequency band width.

The level detectors LV1 to LV5 detect the levels (amplitudes) of the band-limited IF signals supplied from the narrow band pass filters FL1 to FL5, and output respective detection results.

The comparators CP1 to CP4 are provided to operate based on a detection result outputted from the level detector LV1 as a reference, and make comparisons between the detection result and the respective detection results outputted from the level detectors LV2 to LV5, thereby detecting, among IF signals outputted from the narrow band pass filters FL2 to FL5, an IF signal having a higher level than an IF signal outputted from the narrow band pass filter FL1. Then, each of the comparators CP1 to CP4 operates to supply a binary signal to the switchover control signal generating circuit CNT. Such binary signal becomes logic "H" when detecting an IF signal having a higher level than an IF signal outputted from the narrow band pass filter FL1, and becomes logic "L" when not detecting such an IF signal.

The switchover control signal generating circuit CNT is formed by a logical operation circuit. By performing a logical operation on the four binary signals supplied from the comparators CP1 to CP4, the circuit CNT detects whether an interference signal caused by an adjacent interference is contained in at least one of the IF signals outputted from the narrow band pass filters FL2 to FL5, and outputs to the switching circuit 16 a switchover control signal Sa which becomes logic "L" when at least one of the IF signals contains the interference signal, but becomes logic "H" when none of the IF signals contains an interference signal.

When the switchover control signal generating circuit CNT outputs a switchover control signal Sa which is logic "H", the switching circuit 16 will be switched to an input contact a3, thereby outputting as a detection output signal Sout a main detection signal Sd0 outputted from the detector 5. On the other hand, when the switchover control signal generating circuit CNT outputs a switchover control signal Sa which is logic "L", the switching circuit 16 will be switched to an input contact b3, thereby outputting as a detection output signal Sout a sub detection signal Scp outputted from the switching circuit 15b.

The adjacent interference identifying unit 13 shown in FIG. 1 comprises envelope detectors 17 and 18, high-speed charging low-speed discharging circuits 19 and 20, a comparator 21, a switching circuit 22, an adder 23, a level adjusting circuit 24, a comparator 25, a switching circuit 26, a coefficient circuit 27, and a comparator 28, all shown in FIG. 3.

The control circuit 14 shown in FIG. 1 comprises switching circuits 29 and 30, AND circuits 32 and 34, NOT circuits 33 and 36, and NAND circuits 35 and 37, all shown in FIG. 3.

The narrow band filters 7, 8, and 9, and the detector 5 are subordinately connected to the IF filter 4 in the same manner as shown in FIG. 1, while the detectors 10, 11, and 12 are subordinately connected to the outputs of the band filters 7, 8, and 9.

Furthermore, the outputs of the detectors 10, 11 are connected to the input contacts a1, b1 of the switching circuit 15a, while the output contact c1 of the switching circuit 15a is connected to one input contact a2 of the switching circuit 15b, and the output of the detector 12 is connected to the other input contact b2 of the switching circuit 15b. Further, the output contact c2 of the switching circuit 15b is connected to the input contact b3 of the switching circuit 16, while the output of the detector 5 is connected to the input contact a3 of the switching circuit 16, thus allowing a detection output signal Sout to be outputted from the output contact c3 of the switching circuit 16.

Next, description will be given to explain an operation of the adjacent interference identifying unit 13.

At first, the envelope detector 17 converts the amplitude of a first IF signal S1 outputted from the narrow band filter 7 into an amplitude of an absolute value, detects an envelope signal, and outputs the detected envelope signal S4.

Meanwhile, the envelope detector 18 converts the amplitude of a second IF signal S2 outputted from the narrow band filter 8 into an amplitude of an absolute value, detects an envelope signal, and outputs the detected envelope signal S5.

The high-speed charging low-speed discharging circuit 19 is formed by an active filter which inputs into itself an envelope signal S4 and has a predetermined time constant. In fact, the high-speed charging low-speed discharging circuit 19 is operated in a manner such that it is charged when there is an increase in the amplitude of the envelope signal S4 and discharges slowly when there is a decrease in the amplitude of the envelope signal S4, thereby ensuring a predetermined charging voltage, and outputting a signal S6 indicating a charging/discharging voltage (hereinafter, referred to as "first hold signal").

Similar to the high-speed charging low-speed discharging circuit 19, the high-speed charging low-speed discharging circuit 20 is also formed by an active filter which inputs into itself an envelope signal S5. In fact, the high-speed charging low-speed discharging circuit 19 is operated in a manner such that it is charged when there is an increase in the amplitude of the envelope signal S5 and discharges slowly when there is a decrease in the amplitude of the envelope signal S5, thereby ensuring a predetermined charging voltage, and outputting a signal S7 indicating a charging/discharging voltage (hereinafter, referred to as "second hold signal").

The comparator 21 performs a comparison between the first hold signal S6 and the second hold signal S7, and outputs a binary signal (hereinafter, referred to as "identification signal") which becomes logic "H" when the first hold signal S6 has a larger amplitude, and becomes logic "L" when the second hold signal S7 has a larger amplitude.

Namely, when an interference signal is contained in the first IF signal S1 outputted from the narrow band filter 7 and no interference signal is contained in the second IF signal S2 outputted from the narrow band filter 8, since the first hold signal S6 has a larger amplitude than the second hold signal S7, the comparator 21 will output an identification signal SID which is logic "H", thereby performing an identification indicating that an interference signal is not contained in the first IF signal S1.

On the other hand, when an interference signal is not contained in the first IF signal S1 but contained in the second IF signal S2, since the first hold signal S6 has a smaller amplitude than the second hold signal S7, the comparator 21 will output an identification signal SID which is logic "H", thereby performing an identification indicating that an interference signal is contained in the second IF signal S2.

The switching circuit 22 is formed by a two-input one-output type analog switch or the like which is switchover-controlled by an identification signal SID. In detail, the first hold signal S6 is supplied to one input contact a4 of the switching circuit 22, while the second hold signal S7 is supplied to the other input contact b4 of the switching circuit 22. An output contact c4 of the switching circuit 22 is connected to the level adjusting circuit 24. In a period during which an identification signal SID is logic "H", the switching circuit 22 switches over to the input contact b4, so that the second hold signal S7 is transmitted as a level signal SLV to the level adjusting circuit 24. On the other hand, in a period during which an identification signal SID is logic "L", the switching circuit 22 switches over to the input contact a4, so that the first hold signal S6 is transmitted as a level signal SLV to the level adjusting circuit 24.

Namely, the switching circuit 22 performs its switchover operation under control of the identification signal SID, so as to transmit the first hold signal S6 or the second hold signal S7 (the one not affected by any interference signal) as a level signal SLV to the level adjusting circuit 24.

The level adjusting circuit 24 is provided to apply an appropriate off-set voltage to the level signal SLV.

Namely, the level adjusting circuit 24 is provided to perform a fine adjustment on the amplitude of the level signal SLV during an assembling process, so as to correct an undesired influence caused by characteristic irregularities of electronic elements used in the adjacent interference removal device of the present embodiment, and to effect the fine adjustment on the amplitude of the level signal SLV by taking into account the differences among the communication environments of different areas in which receivers are in use.

Then, the adder 23 adds together the envelope signals S4 and S5, thereby outputting an added signal S8.

The comparator 25 performs a comparison between the amplitude of the added signal S8 and the amplitude of a level signal SLVa adjusted by the level adjusting circuit 24, and detects a period during which the two amplitudes are different from each other, as a period during which an interference signal occurs (hereinafter, referred to as "interference occurring period"). Subsequently, the comparator 25 outputs an interference occurring period signal SPRD which becomes logic "H" during interference occurring periods, but becomes logic "L" during other periods than the interference occurring periods.

The switching circuit 26 is formed by a two-input one-output type analog switch which performs a switchover operation in accordance with an identification signal SID, and transmits one (not affected by any interference signal) of the envelope signals S4 and S5 outputted from the envelope detectors 17 and 18 to a comparator 28.

Namely, as described above, the identification signal SID becomes logic "H" when an interference signal is contained in the envelope signal S4 and in the first IF signal S1, but becomes logic "L" when an interference signal is contained in the envelope signal S5 and in the second IF signal S2. Accordingly, in each period during which the identification signal SID becomes logic "H", the switching circuit 26 will switch over to the input contact b5, thereby transmitting to the comparator 28 the envelope signal S5 as a candidate not containing any interference signal. On the other hand, in each period during which the identification signal SID becomes logic "L", the switching circuit 26 will switch over to the input contact a5, thereby transmitting to the comparator 28 the envelope signal S4 as a candidate not containing any interference signal.

The coefficient circuit 27 is formed by an attenuator capable of adjusting an attenuation factor, and supplies a threshold signal SLVb for attenuating the amplitude of the level signal SLV to the comparator 28.

Namely, the coefficient circuit 27 operates in the same manner as the level adjusting circuit 24, and performs a fine adjustment on the amplitude of the level signal SLV during an assembling process, so as to correct an undesired influence caused by characteristic irregularities of electronic elements used in the adjacent interference removal device of the present embodiment, and to effect the fine adjustment on the amplitude of the level signal SLV by taking into account the differences among the communication environments of different areas in which receivers are in use. In the assembling process, it is preferable to adjust the above attenuation factor in advance such that the amplitude of the threshold signal SLVb will be about ½ of the amplitude of the level signal SLV.

The comparator 28 is connected to the output contact c5 of the switching circuit 26 as well as to the output of the coefficient circuit 27, and performs a comparison between the threshold signal SLVb and the envelope signal S4 or S5 supplied through the switching circuit 26 and containing no interference signal.

Then, the comparator 28 outputs a binary signal (hereinafter, referred to as "effective period signal") which becomes logic "H" when the amplitude of the envelope signal S4 or S5 is larger than the amplitude of the threshold signal SLVb, and becomes logic "L" when the amplitude of the envelope signal S4 or S5 is smaller than the amplitude of the threshold signal SLVb.

Namely, as described above, since the comparator 28 receives the envelope signal S4 or S5 not containing any interference signal, the comparator will judge whether the envelope signal S4 or S5 has an adequate amplitude by comparing such amplitude with the threshold signal SLVb. If the envelope signal S4 or S5 has an adequate amplitude, the comparator 28 will output an effective period signal SFIX which is logic "H" indicating that the receiver is in its good reception condition. On the other hand, if the envelope signal S4 or S5 does not have an adequate amplitude, the comparator 28 will output an effective period signal SFIX which is logic "L" indicating that the receiver is not in its good reception condition.

In this way, the adjacent interference identifying unit 13 performs the above-described processing in accordance with the envelope signals S4 and S5 outputted from the envelope detectors 17 and 18, thereby generating an identification signal-SID for identifying an IF signal (which is one of the first and second IF signals S1 and S2) not containing any interference signal, as well as an interference occurring period signal SPRD indicating a period during which the interference signal occurs. Further, when an interference signal is not contained in the first and second IF signals S1 and S2, the adjacent interference identifying unit 13 generates an effective period signal SFIX indicating whether the first and second IF signals S1 and S2 have an adequate amplitude.

Next, description will be given in detail to explain the structure of the control unit 14.

As shown, the NOT circuit 33 and the AND circuit 34 perform a predetermined logical operation on the interference occurring period signal SPRD and the effective period signal SFIX, to generate and output a switchover control signal CHG indicating whether an interference signal is contained in each of the first IF signal S1 and the second IF signal S2.

Namely, under a reception condition in which an interference signal is contained in each of the first IF signal S1 and the second IF signal S2, once the NOT circuit 33 and the AND circuit 34 perform a predetermined logical operation, a switchover control signal CHG which is logic "L" will be outputted from the AND circuit 34 and supplied to the switching circuit 15b. On the other hand, under a reception condition in which an interference signal is contained in one of the first IF signal S1 and the second IF signal S2, once the NOT circuit 33 and the AND circuit 34 perform a predetermined logical operation, a switchover control signal CHG which is logic "H" will be outputted from the AND circuit 34 and supplied to the switching circuit 15b.

Then, once the switchover control signal CHG becomes logic "H", the switching circuit 15b will switch over to its input contact b2, and supplies the third detection signal Sd3 as a sub detection signal Scp to the switching circuit 16. On the other hand, once the switchover control signal CHG becomes logic "L", the switching circuit 15b will switch over to its input contact a2, so that the first detection signal Sd1 or the second detection signal Sd2 from the switching circuit 15a may be transmitted as a sub detection signal Scp to the switching circuit 16.

The AND circuit 32 performs an AND operation on the interference occurring period signal SPRD and the effective period signal SFIX, thereby generating and outputting a confirmation signal SWRT for confirming that an interference signal is contained in each of the first and second IF signals S1 and S2.

On the other hand, the AND circuit 35 performs an AND operation on the confirmation signal SWRT and the interference occurring period signal SPRD, to confirm whether the envelope signal S4 contains an interference signal, and output a first cut-off signal CUT1 which becomes logic "H" when an interference signal is not contained in the envelope signal S4, and becomes logic "L" when an interference signal is contained in the envelope signal S4.

Further, the NOT circuit 36 and the AND circuit 37 perform a predetermined logical operation on the confirmation signal SWRT and the interference occurring period signal SPRD, to confirm whether the envelope signal S5 contains an interference signal, and output a second cut-off signal CUT2 which becomes logic "H" when an interference signal is not contained in the envelope signal S5, and becomes logic "L" when an interference signal is contained in the envelope signal S5.

Then, the switching circuit 29 will be OFF when the first cut-off signal CUT1 is logic "L" and ON when the first cut-off signal CUT1 is logic "H". During the period of OFF, a signal of ground potential is compulsorily applied to one input terminal of the comparator 31. On the other hand, during the period of ON, the envelope signal S4 is supplied to the same input terminal of the comparator 31.

Meanwhile, the switching circuit 30 will be OFF when the second cut-off signal CUT2 is logic "L" and ON when the second cut-off signal CUT2 is logic "H". During the period of OFF, a signal of ground potential is compulsorily applied to the other input terminal of the comparator 31. On the other hand, during the period of ON, the envelope signal S5 is supplied to the same input terminal of the comparator 31.

Moreover, the comparator 31 performs a comparison between the amplitudes of the signals supplied through the switching circuits 29 and 30, and outputs a switchover control signal SEL which becomes logic "H" when the amplitude of the signal from the switching circuit 29 is larger than the amplitude of the signal from the switching circuit 30, but becomes logic "L" when the amplitude of the signal from the switching circuit 29 is smaller than the amplitude of the signal from the switching circuit 30. The switchover control signal SEL is then supplied to the switching circuit 15a.

When the switchover control signal SEL becomes logic "H", the switching circuit 15a will switchover to its input contact a1 so as to transmit the first detection signal Sd1 from the detector 10 to the input contact a2 of the switching circuit 15b. On the other hand, when the switchover control signal SEL becomes logic "L", the switching circuit 15a will switchover to its input contact b1 so as to transmit the second detection signal Sd2 from the detector 11 to the input contact a2 of the switching circuit 15b.

Here, the switchover control signals CHG and SEL shown in FIG. 3 correspond to the switchover control signal Sb shown in FIG. 1.

Next, description will be given to explain an example of an operation of the adjacent interference removal device having the above-described structure constituted according to the present embodiment, with reference to FIGS. 5 through 12.

Figure 5:
FIGS. 5A through 5D are waveform charts showing the waveforms of main IF signal Sin and first, second, and third IF signals S1, S2, and S3 when an interference signal is not existing.
Figure 5:
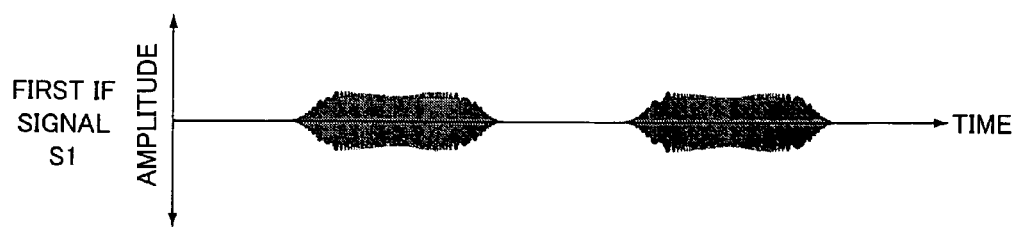
Figure 5:
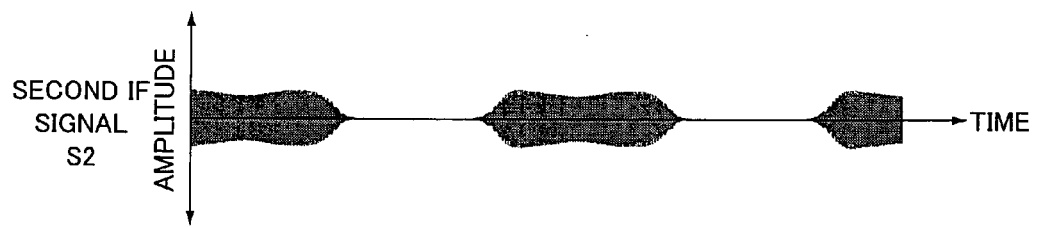
Figure 5:
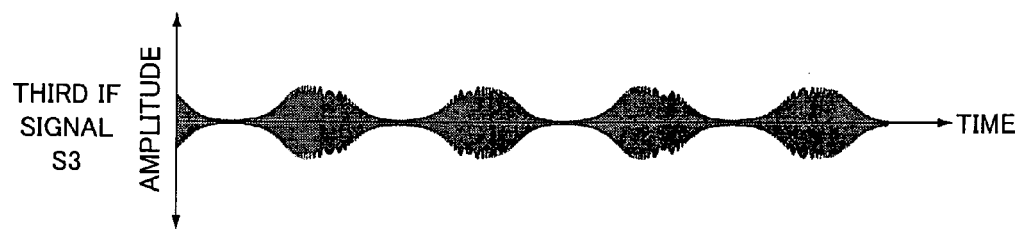
Figure 6A:
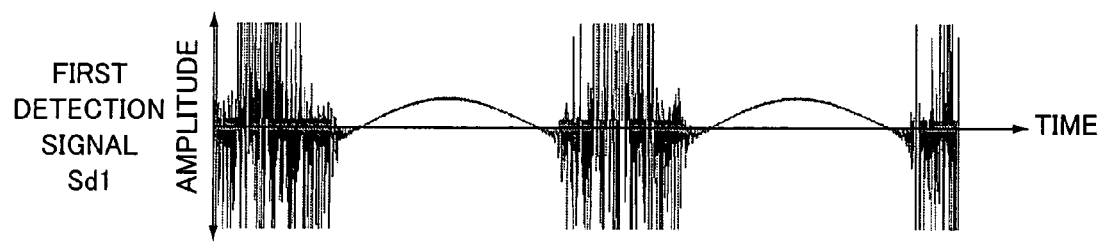
FIGS. 6A through 6D are waveform charts showing the waveforms of first, second, and third detection signals Sd1, Sd1, and Sd3, as well as another detection signal Sx when an interference signal is not existing.
Figure 6B:
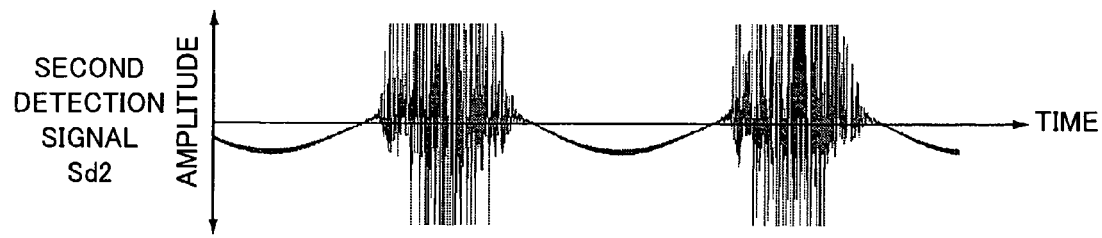
Figure 6C:
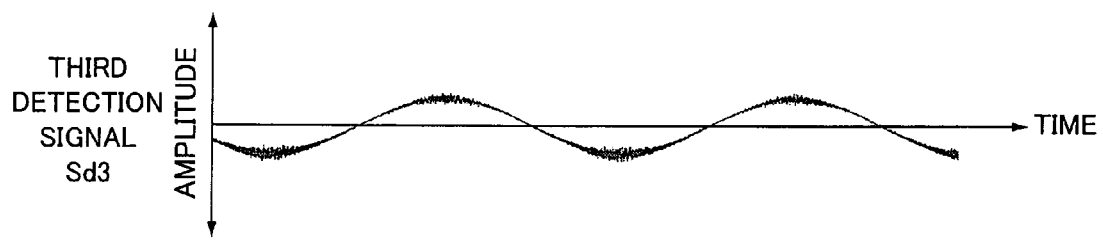
Figure 6D:
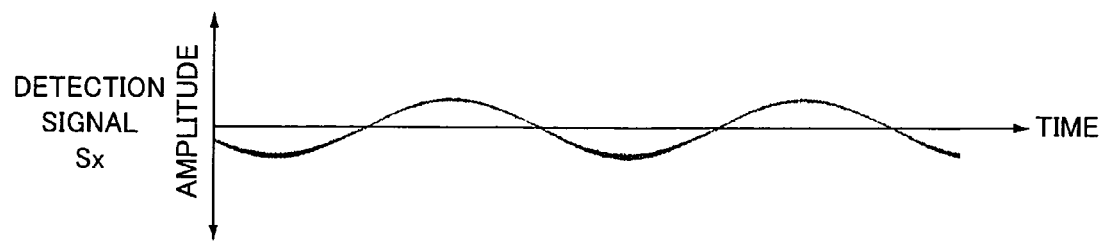
Figure 7:
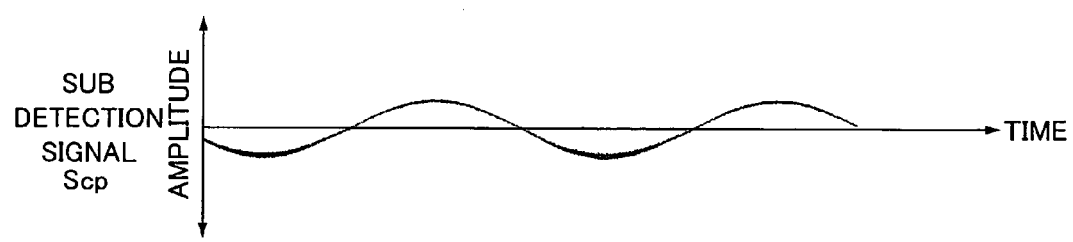
FIGS. 7A and 7B are waveform charts showing the waveforms of sub detection signal Scp and switchover control signal SEL when an interference signal is not existing.
Figure 7:
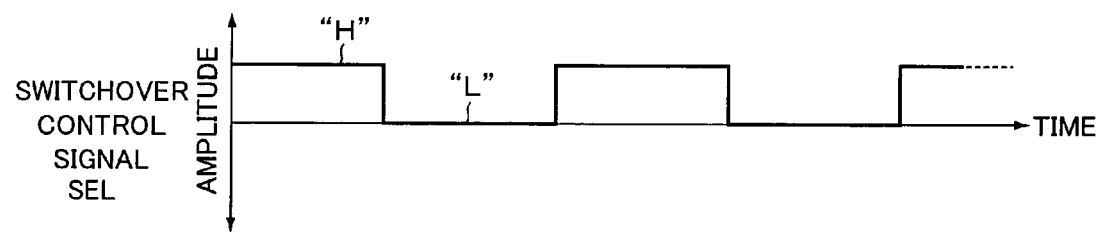
Figure 8:
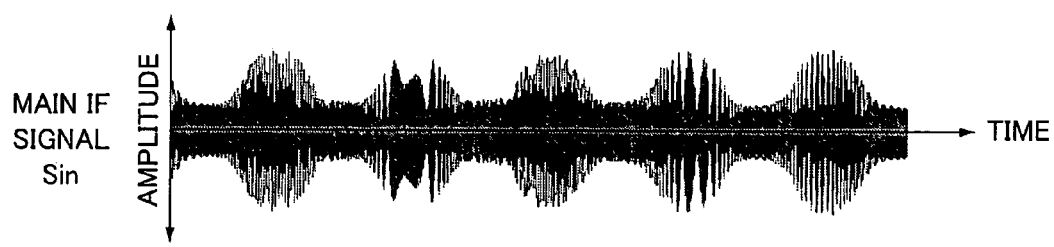
FIGS. 8A through 8D are waveform charts showing the waveforms of main IF signal Sin and first, second, and third IF signals S1, S2, and S3 when an interference signal is existing.
Figure 8:
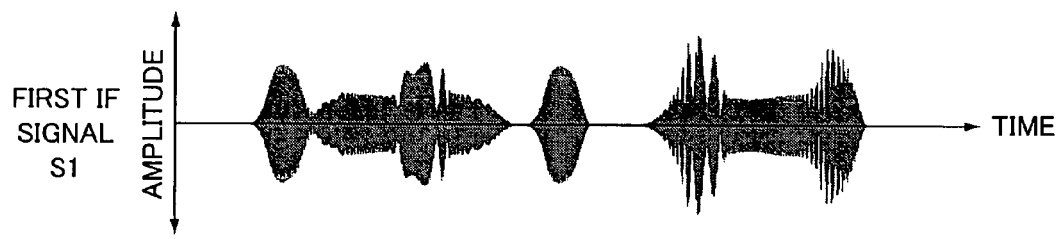
Figure 8:
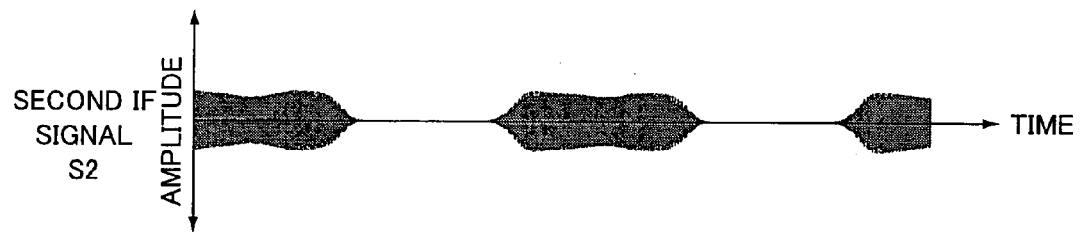
Figure 8:
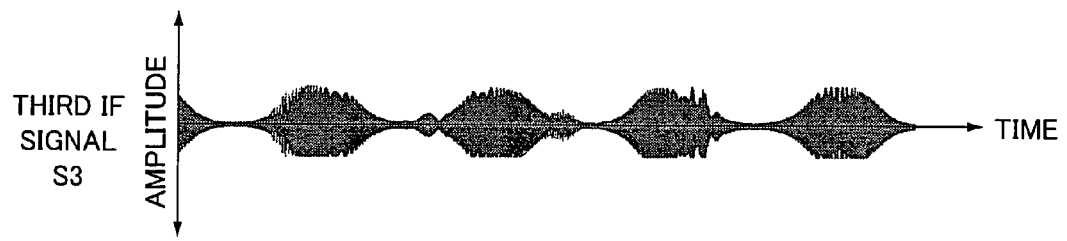
Figure 9:
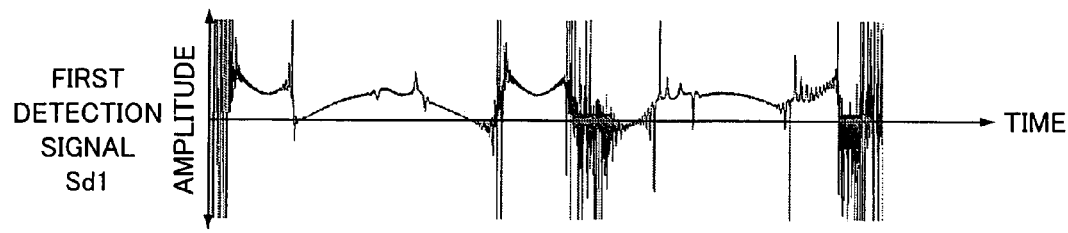
FIGS. 9A through 9C are waveform charts showing the waveforms of first, second, and third detection signals Sd1, Sd1, and Sd3, as well as another detection signal Sx when an interference signal is existing.
Figure 9:
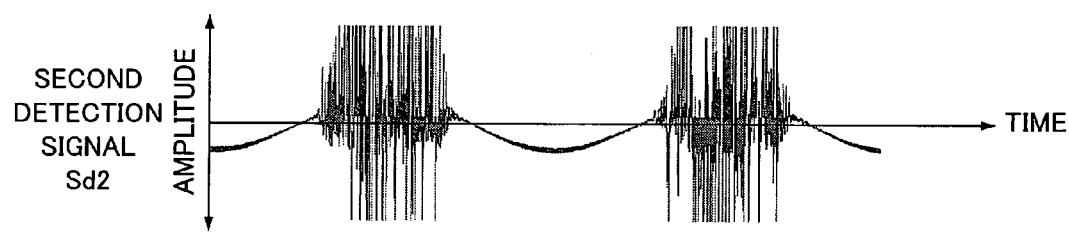
Figure 9:
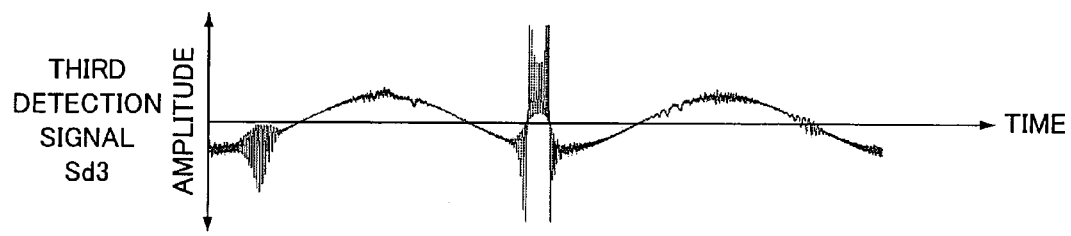
Figure 10:
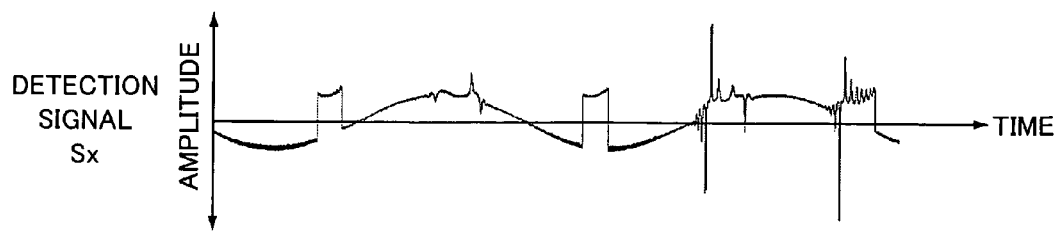
FIGS. 10A through 10E are waveform charts showing the waveforms of detection signal Sx, sub detection signal Scp, and switchover control signals SEL, CHG when an interference signal is existing.
Figure 10:
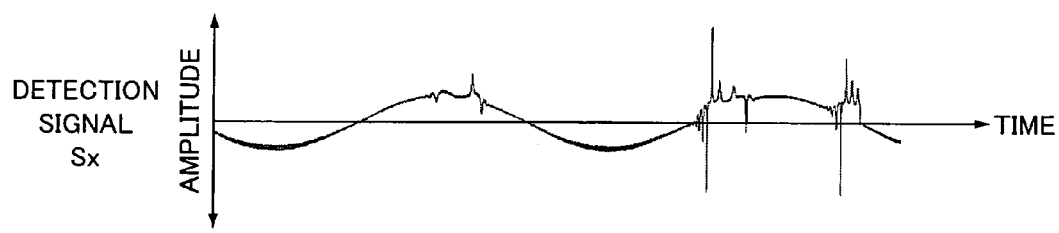
Figure 10:
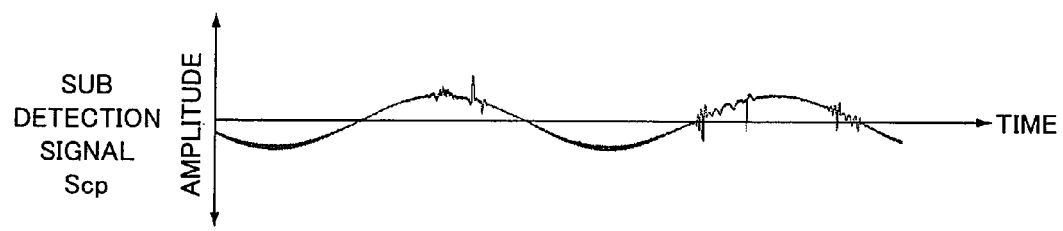
Figure 10:
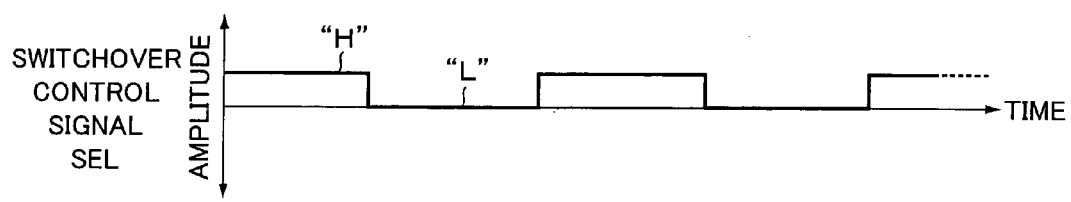
Figure 10:
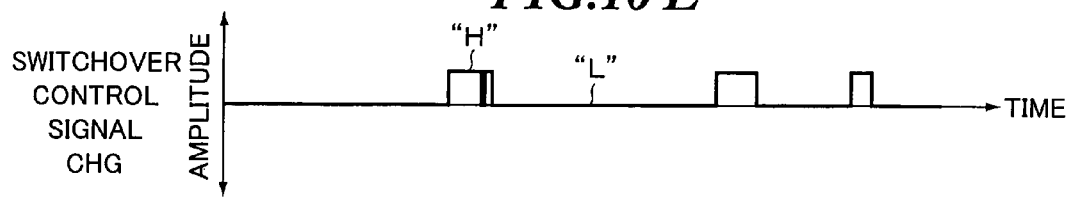
Figure 11:
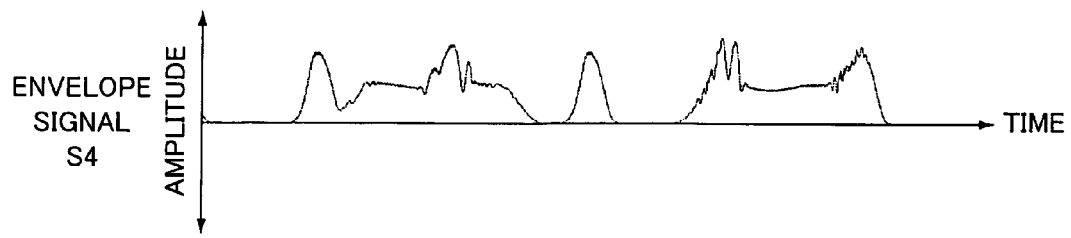
FIGS. 11A through 11D are waveform charts showing the waveforms of envelope signals S4, S5 and hold signals S6, S7 and an addition signal S8 when an interference signal is existing.
Figure 11:
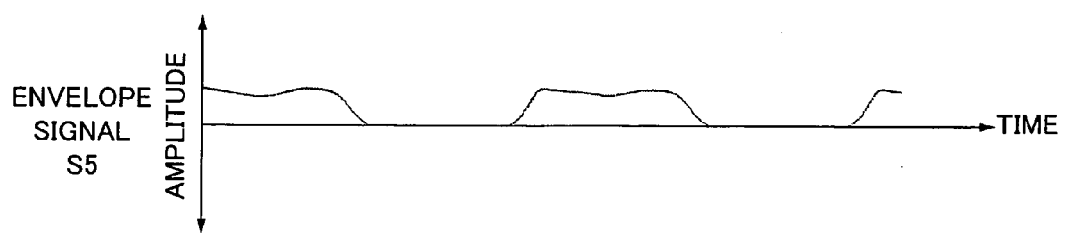
Figure 11:
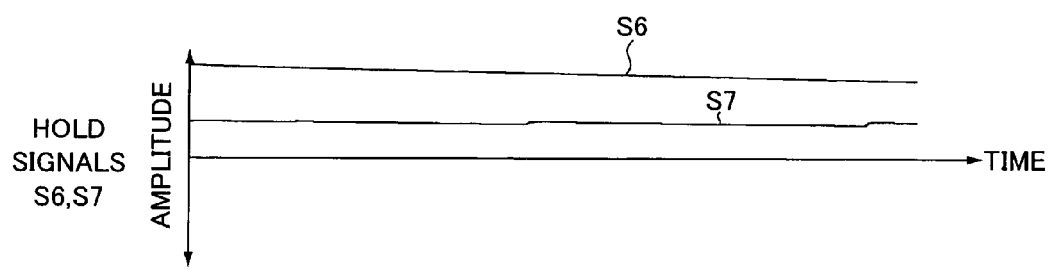
Figure 11:
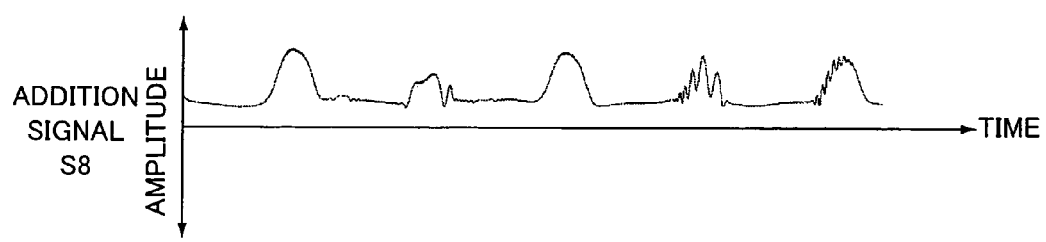
Figure 12:
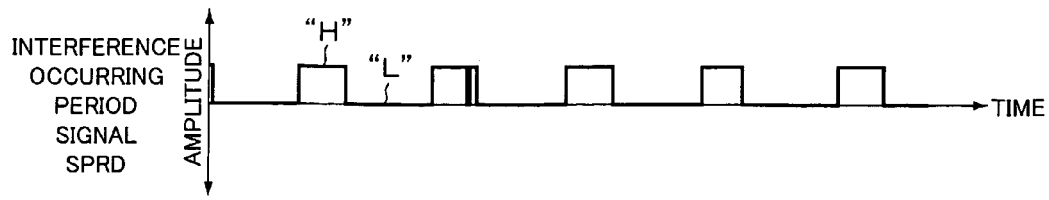
FIGS. 12A through 12E are waveform charts showing the waveforms of an interference occurring period signal SPRD, an effective period signal SFIX, a confirmation signal SWRT, first and second cut-off signals CUT1 and CUT2 when an interference signal is existing.
Figure 12:
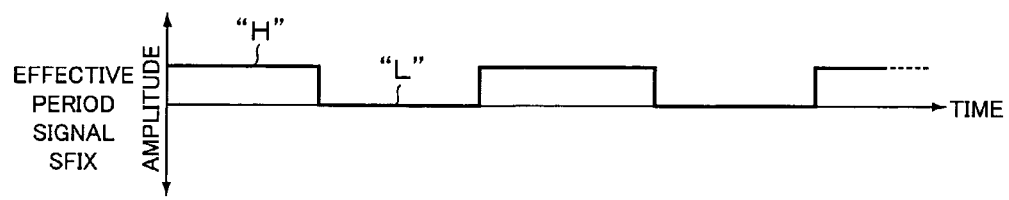
Figure 12:
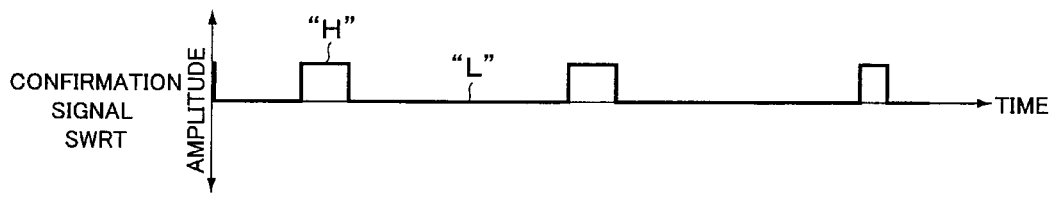
Figure 12:
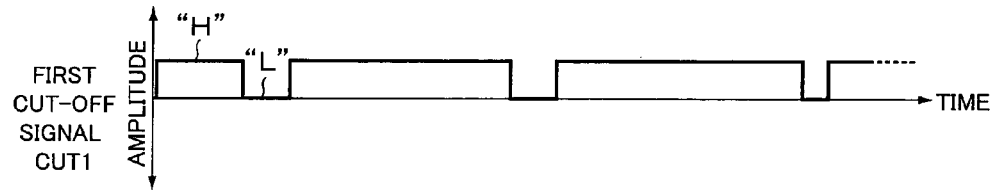
Figure 12:
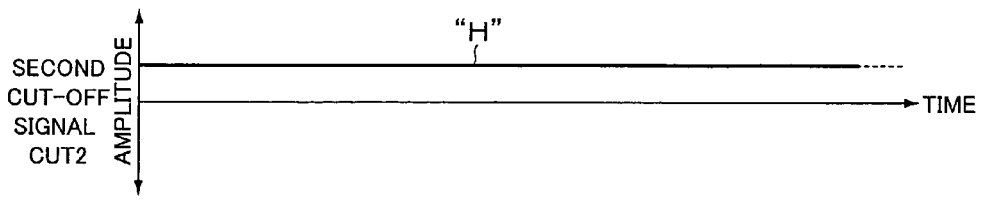

FIGS. 5 to 7 are waveform charts showing the waveforms of various signals when there is no interference signal caused by an adjacent interference. FIGS. 6 to 12 are waveform charts corresponding to FIGS. 5 to 7, showing the waveforms of various signals when there is an interference signal from an adjacent station having a frequency +Fsp1 (+100 kHz) shown in FIG. 2 as its adjacent channel.

When the main IF signal Sin shown in FIG. 5A not containing any interference signal is outputted from the IF filter 4, the adjacent station detecting circuit 6 will detect that there is no interference signal, and allows the switching circuit 16 to switch over to its input contact a3, so as to output the first detection signal Sd0 from the detector 5 as the detection output signal Sout.

Then, even in a period during which the first detection signal Sd0 is outputted as the detection output signal Sout, the adjacent interference removal device of the present embodiment will still operate continuously, thereby outputting signals having waveforms shown from FIG. 5B onwards.

Namely, as shown in FIG. 5B, the first IF signal S1 outputted from the narrow band filter 7, at the time the main IF signal is deviated in frequency to the upper side from the center frequency F0, will have an amplitude change in proportion to the amplitude of the main IF signal Sin, but will have an extremely small amplitude when the main IF signal Sin is deviated in frequency to the lower side from the center frequency F0.

On the other hand, as shown in FIG. 5C, the second IF signal S2 outputted from the narrow band filter 8, at the time the main IF signal is deviated in frequency to the upper side from the center frequency F0, has an extremely small amplitude, but will have an amplitude change in proportion to the amplitude of the main IF signal Sin when the main IF signal Sin is deviated in frequency to the lower side from the center frequency F0.

Meanwhile, as shown in FIG. 5D, the third IF signal S3 outputted from the narrow band filter 9 has an amplitude change, corresponding to the frequency deviations of the main IF signal Sin to the upper side and to the lower side from the center frequency F0.

Then, the adjacent interference removal device of the present embodiment processes the first, second, and third IF signals S1, S2, and S3, thereby outputting various signals shown in FIG. 6 and FIG. 7.

On the other hand, when the IF filter 4 outputs a main IF signal Sin (as shown in FIG. 8A) containing an interference signal from an adjacent station having a frequency +Fsp1 (+100 kHz) as its adjacent channel, the adjacent station detecting circuit 6 will detect an interference signal and allow the switching circuit 16 to switch over to its input contact b3.

In this way, the adjacent interference removal device of the present embodiment can perform a predetermined processing on the main IF signal Sin containing an interference signal, thereby outputting signals having various waveforms shown from FIG. 8B onwards.

At this time, the first, second, and third IF signals S1, S2, and S3 outputted from the narrow band filters 7, 8, and 9 will be like those shown in FIG. 5B, FIG. 5C, and FIG. 5D. Therefore, the adjacent interference removal device of the present embodiment can process the first, second, and third IF signals S1, S2, and S3 so as to output various signals shown in FIGS. 9 to 12.

Then, the switching circuits 15*a,* 15*b,* 29, and 30 will perform switchover operations, in accordance with the switchover control signals SEL and CHG, the first and second cut-off signals CUT1 and CUT2 shown in FIG. 10D, FIG. 10E, FIG. 12D, and FIG. 12E, to finely select portions (not affected by any interference signal) of the first, second, and third detection signals Sd1, Sd2, and Sd3, so as to reproduce timely continued detection signals, thereby outputting as the detection output signal Sout a sub detection signal Scp having a reduced noise and a reduced distortion, as shown in FIG. 10C.

Here, if the switching circuits 29 and 30 are not ON/OFF controlled by the cut-off signals CUT1 and CUT2, when the amplitudes of the envelope signals S4 and S5 become large under the influence of an interference signal, a large amplitude distortion will be mixed into a detection signal Sx outputted from the switching circuit 15*a*, as shown in FIG. 10A. However, if the switching circuits 29 and 30 are ON/OFF controlled by the cut-off signals CUT1 and CUT2, it is possible to prevent a large amplitude distortion from being mixed into a detection signal Sx, as shown in FIG. 10B. As a result, it is possible to output as the detection output signal Sout a sub detection signal Scp having a reduced noise and a reduced distortion, as shown in FIG. 10C.

Although the above description is based on an example in which the IF filter 4 outputs a main IF signal Sin containing an interference signal from an adjacent station having a frequency +Fsp1 (+100 kHz) as an adjacent channel, the present invention can also be applied to another case in which the IF filter 4 outputs a main IF signal Sin containing an interference signal from an adjacent station having a frequency −Fsp1 (−100 kHz) as an adjacent channel, thereby making it possible to output as the detection output signal Sout a sub detection signal Scp having a reduced noise and a reduced distortion.

Moreover, it is possible to output as the detection output signal Sout a sub detection signal Scp having a reduced noise and a reduced distortion, irrespective of whether an actual situation is that the IF filter 4 outputs a main IF signal Sin containing an interference signal from an adjacent station having a frequency +Fsp1 (+100 kHz) as an adjacent channel, or that the IF filter 4 outputs a main IF signal Sin containing an interference signal from an adjacent station having a frequency +Fsp2 (+200 kHz) as an adjacent channel.

As described above, the IF signal S1 is outputted from the narrow band filter 7 having a pass frequency band width extending from the center frequency F0 to a frequency +FR1 which is ½ of a high band cut-off frequency +Fsp1, while the IF signal S2 is outputted from the narrow band filter 8 having a pass frequency band width extending from the center frequency F0 to a frequency −FR1 which is ½ of a high band cut-off frequency −Fsp1. In using the adjacent interference removal device of the present embodiment, when a sub detection signal Scp is outputted as a detection output signal Sout, a detection signal Sd1 or Sd2 generated by detecting an IF signal not containing any interference signal (which IF signal is the IF signal S1 or the IF signal S2) is selected as a sub detection signal Scp and used as a detection output signal Sout. Therefore, it is possible to output a detection output signal Sout free from any influence of an interference signal, without greatly removing an original detection signal component contained in a main IF signal Sin. For this reason, it is possible to reproduce, based on the detection output signal Sout, a high quality sound signal having a reduced distortion, thereby making it possible to improve a reception quality.

Further, in case an interference signal is contained in each of the IF signals S1 and S2, a detection signal Sd3 generated by detecting the IF signal S3 outputted from the narrow band filter 9 (having a pass frequency band narrower than a total pass frequency band of the narrow band filters 7 and 8) is selected as a sub detection signal Scp and used as a detection output signal Sout, so that it is possible to exactly output a detection output signal Sout free from any interference signal.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An adjacent interference removal device for removing an influence of an adjacent interference caused by an interference signal contained in an IF signal having passed through an IF filter having a pass frequency band width with the carrier frequency as its center, said device comprising:

a first narrow band filter which inputs into itself the IF signal and has a pass frequency band width extending from the carrier frequency of the IF filter to a predetermined frequency higher than an upper side closest adjacent channel carrier frequency;

a second narrow band filter which inputs into itself the IF signal and has a pass frequency band width extending from the carrier frequency of the IF filter to a predetermined frequency lower than a lowe side closest adjacent channel carrier frequency;

first detecting means for detecting a first signal having passed through the first narrow band filter;

second detecting means for detecting a second signal having passed through the second narrow band filter;

signal selecting means for outputting at least a first detection signal outputted from the first detecting means or a second detection signal outputted from the second detecting means;

identifying means for identifying whether an interference signal is contained in the first signal or contained in the second signal; and control means which allows the signal selecting means to output the first detection signal when the identifying means identifies that the interference signal is contained in the first signal but not in the second signal, and allows the signal selecting means to output the second detection signal when the identifying means identifies that the interference signal is contained in the second signal but not in the first signal;

main detecting means for supplying a main detection signal generated by detecting the IF signal to the signal selecting means;

a narrow band pass filter that inputs into itself the IF signal and has a narrow pass frequency band width coincident with the carrier frequency of an adjacent channel; and adjacent station detecting means that detects whether an interference signal is contained in an output signal of the narrow band pass filter, and allows the signal selecting means to output the first or second detection signal when an interference signal is detected, but allows the signal selecting means to putout the main detection signal when the interference signal is not detected.

2. The adjacent interference removal device according to claim 1, further comprising:
a third narrow bad filter which inputs into itself the IF signal, uses said carrier frequency as its center, and has a pass frequency band width narrower than that of each of the first and second narrow band filters; and
third detection means for detecting a third signal having passed through the third narrow band filter, and supplying a third detection signal to the signal selecting means,
wherein once the identifying means identifies that an interference signal is contained in each of the first signal and the second signal, the control means allows the signal selecting means to output the third detection signal.

3. The adjacent interference removal device according to claim 1, wherein the first narrow band filter has a pass frequency band width extending from the carrier frequency of the IF filter to a frequency which is ½ of an upper side closest adjacent channel carrier frequency.

4. The adjacent interference removable device according to claim 1, wherein the second narrow band filter has a pass frequency band width extending from the carrier frequency of the IF filter to a frequency which is ½ of a lower side closest adjacent channel carrier frequency.

5. The adjacent interference removable device according to claim 1, wherein the third narrow band filter has a pass frequency band width taking said carrier frequency as its center and having a width which is ½ of the pass frequency band width of each of the first and second narrow band filters.

6. The adjacent interference removable device according to claim 1, wherein the first narrow band filter has a pass frequency band width extending from the carrier frequency of the IF filter to an upper side frequency +50 KHz.

7. The adjacent interference removable device according to claim 1, wherein the second narrow band filter has a pass frequency band width extending from the carrier frequency of the IF filter to a lower side frequency −50 KHz.

8. The adjacent interference removable device according to claim 1, wherein the third narrow band filter has a pass frequency band width taking said carrier frequency as its center and extending from −25 KHz to +25 KHz.

\* \* \* \* \*